United States Patent [19]

Collins et al.

[11] 4,148,681
[45] Apr. 10, 1979

[54] EXPANDABLE CARRIER APPARATUS FOR A TIRE BUILDING MACHINE

[75] Inventors: Marcus H. Collins, Akron; Kiritkumar R. Patel, Broadview Heights, both of Ohio

[73] Assignee: Eaton Corporation, Cleveland, Ohio

[21] Appl. No.: 813,152

[22] Filed: Jul. 5, 1977

[51] Int. Cl.$^2$ ............................................. B29H 17/20
[52] U.S. Cl. .................................. 156/405 R; 92/92; 156/126; 156/406
[58] Field of Search .................... 156/123 R, 126, 127, 156/128 R, 128 I, 129, 133, 394, 396, 405, 414–420; 92/92, 98 R, 99, 100, 103 F, 103 SD; 152/169, 172, 179, 182, 350, 208, 216, 223, 228

[56] References Cited

U.S. PATENT DOCUMENTS

| | | | |
|---|---|---|---|
| 2,662,625 | 12/1953 | Fawick | 92/92 |
| 3,075,624 | 1/1963 | Fawick | 92/92 |
| 3,092,231 | 6/1963 | Kneuss | 192/107 |
| 3,151,013 | 9/1964 | Nebout | 156/128 |
| 3,442,746 | 5/1969 | Robertson | 156/127 |
| 3,475,254 | 10/1969 | Henley | 156/123 |
| 3,503,829 | 3/1970 | Menell et al. | 156/133 |
| 3,525,655 | 8/1970 | Wood et al. | 156/123 |
| 3,839,123 | 10/1974 | Sausaman | 156/129 |

FOREIGN PATENT DOCUMENTS 621826 6/1961 Canada .................................... 92/92

OTHER PUBLICATIONS

Pamphlets, "Airflex" Clutches and Brakes from Eaton Corp., Cleveland, Ohio, Jan. 1, 1978.

*Primary Examiner*—John E. Kittle
*Attorney, Agent, or Firm*—M. L. Union

[57] ABSTRACT

An expandable carrier apparatus for transferring a tread and a radial tread ply band from a first work station to a further work station in a tire building machine includes an annular support member and a fluid expandable annular tube element having an upper wall portion and a lower wall portion. The lower wall portion of the tube element is movable radially away from the upper wall portion upon expansion of the tube element and is movable radially toward the upper wall portion upon contraction of the tube element. The upper wall portion includes an annular peripheral surface which is bonded along a portion of the width thereof to the support member and the lower wall portion includes an annular outer peripheral surface having a plurality of gripper means disposed in an annular array supported thereon which are operable to engage and grip tread and a radial tread ply band upon expansion of the tube element. A plurality of ply bands are disposed in the lower wall portion of the tube element adjacent the plurality of gripper means to increase the rigidity of the lower wall portion to provide for uniform radial movement of the lower wall portion and gripper means upon expansion of the tube element to effect gripping of a radial tread ply band thereby and to prevent collapse of the tube element upon contraction. The ply bands add strength to the lower wall portion without increasing the stiffness of the side wall portions of the tube element.

15 Claims, 2 Drawing Figures

U.S. Patent  Apr. 10, 1979  4,148,681
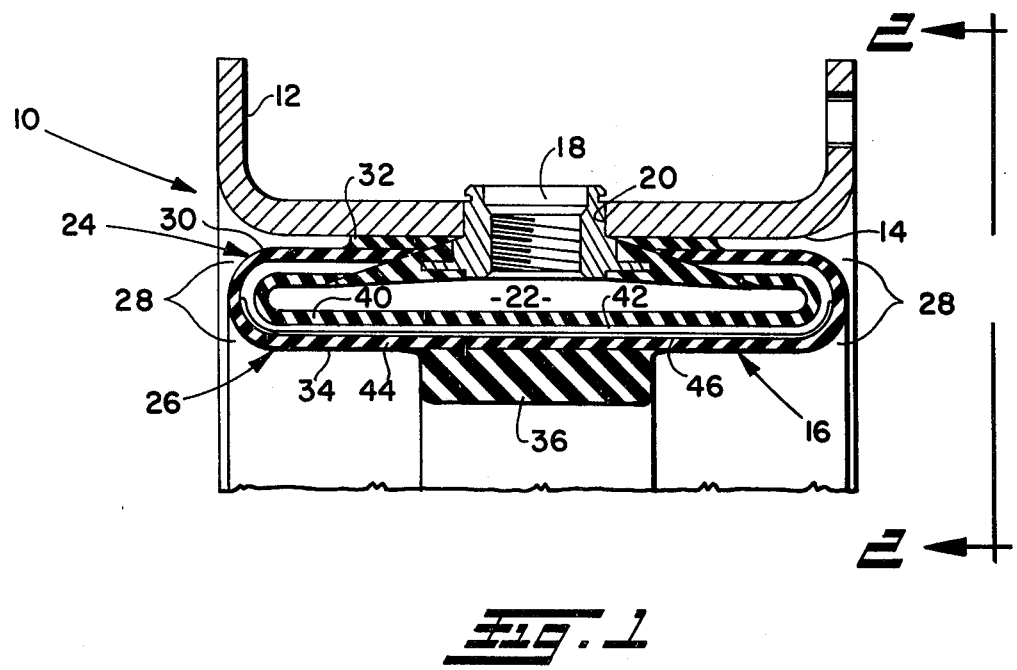
_FIG. 1_
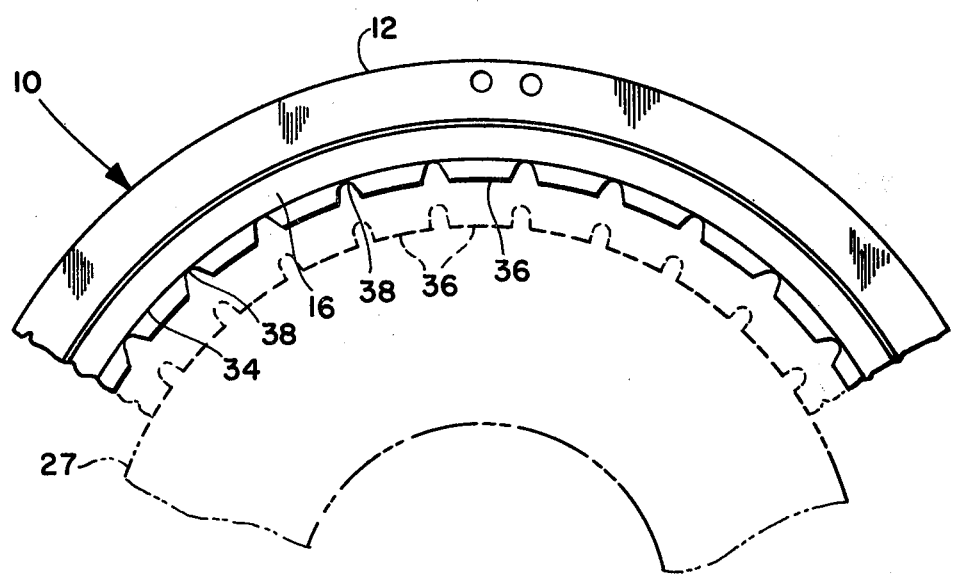
_FIG. 2_

EXPANDABLE CARRIER APPARATUS FOR A TIRE BUILDING MACHINE

PRIOR ART STATEMENT

The following reference is considered to be relevent to the present invention: U.S. Pat. No. 3,475,254, Henley.

U.S. Pat. No. 3,475,254 discloses a transfer apparatus for transferring tire portions between a tread and breaker assembly drum and a carcass building machine.

BACKGROUND OF THE INVENTION

1. Field of the Invention

The present invention relates to an expandable carrier apparatus for transferring a tire portion from a first work station to a second work station and more specifically to an expandable carrier apparatus including an annular fluid expandable tube element including a plurality of gripper means disposed in an annular array on an annular peripheral surface thereof with the gripper means being operable to grip a tire portion disposed centrally thereof upon expansion of the tube element and the resultant decrease in the diameter of the annular array of gripper means.

2. Background of the Invention

Transfer apparatus for tire building machines are known in the art. Most of the known transfer apparatus are extremely complicated which decreases their reliability and increases their cost. One known mechanism is disclosed in the Henley U.S. Pat. No. 3,475,254 wherein a transfer apparatus 31 is disclosed. The complexity of devices such as disclosed in the Henley patent leave much to be desired in providing a carrier apparatus which is reliable, simple in construction, and yet economical.

SUMMARY OF THE INVENTION

The present invention provides a new and improved expandable carrier apparatus for transferring a tread and a radial tread ply band from a building station to a further work station including an annular support member having an annular inner peripheral surface and a fluid expandable tube element having an upper wall portion and a lower wall portion. The lower wall portion of the tube element is movable radially away from the upper wall portion upon expansion of the tube element and is movable radially toward the upper wall portion upon contraction of the tube element. The upper wall portion includes an annular peripheral surface bonded along a portion of the width thereof to the annular inner peripheral surface of the support member. The lower wall portion includes an annular outer peripheral surface having a plurality of gripper means supported in an annular array thereon and operable to engage a tread and a radial tread ply band upon expansion of the tube element. The gripper means is operable to engage and grip a tread and a radial tread ply band disposed centrally of the annular array of gripper means upon expansion of the tube element and the resultant decrease in diameter of the annular array of gripper means. The tube element when contracted effects an increase in the diameter of the annular array of gripper means to thereby release a tread and a radial tread ply band gripped thereby. A plurality of ply bands are disposed in the lower wall portion of the tube element adjacent the plurality of gripper means to increase the rigidity of the lower wall portion to provide for uniform radial movement of the lower wall portion and gripper means upon expansion of the tube element to effect gripping of a tread and a radial tread ply band thereby and to prevent collapse of the tube element upon contraction.

The present invention further provides a new and improved expandable carrier apparatus for transferring a portion of a built tire from a first work station to a second work station including an annular support member having an annular peripheral surface and a fluid expandable annular tube element having an upper wall portion having an outer peripheral surface adapted to be bonded to the annular peripheral surface of the support member and a lower wall portion cooperating with the upper wall portion to define an annular chamber for receiving fluid therein to effect expansion of the tube element. The lower wall portion is movable in a radially inwardly direction away from the upper wall portion upon expansion of the tube element and is movable in a radially outwardly direction toward the upper wall portion upon contraction of the tube element. The lower wall portion includes an annular outer peripheral surface including a plurality of gripper means disposed in an annular array thereon. The gripper means are operable to engage and grip a tire portion disposed in a position surrounded by the outer peripheral surface of the lower wall portion upon expansion of the tube element and operable to ungrip the tire portion upon subsequent contraction of the tube element. The lower wall portion includes a plurality of ply bands disposed adjacent the outer peripheral surface to increase the rigidity of the outer peripheral surface to provide for uniform radial movement of the gripper means upon expansion of the tube element and to provide increased resiliency in the outer peripheral surface of the lower wall portion to enable the gripper means to release a tire portion gripped thereby upon contraction of the tube element.

DESCRIPTION OF THE DRAWINGS

FIG. 1 is a cross-sectional view of the carrier apparatus of the present invention.

FIG. 2 is a reduced scale side view of the carrier apparatus taken approximately along the lines of 2—2 of FIG. 1 and showing the tube element in its contracted condition in full lines and in its expanded condition in phantom lines.

DESCRIPTION OF THE PREFERRED EMBODIMENT

Referring to the drawings, an expandable carrier apparatus 10 for transferring a portion of a built tire from a first work station to a second work station has been illustrated. The expandable carrier apparatus 10 includes an annular support drum 12 having an annular peripheral surface 14 disposed thereon. An annular fluid expandable tube element 16 is bonded to the annular peripheral surface 14 of the support drum 12. A valve 18 is secured through an opening 20 in the support drum 12 and a suitable opening in the tube element 16. The valve 18 is connected to a suitable source of fluid pressure (not illustrated), such as an air line, to enable fluid to be introduced into an annular cavity 22 in the tube element 16 to effect expansion of the tube element 16 and gripping of a portion of a tire as will be described more fully herein below.

The tube element 16 includes an upper wall portion 24 and a lower wall portion 26. The upper and lower wall portions 24, 26 are connected by side wall portions 28. The upper wall portion 24 includes an annular peripheral surface 30. The annular peripheral surface 30 includes a raised portion 32 which is bonded to the annular peripheral surface 14 of the support drum 12. The width of the raised portion 32 of the annular peripheral surface 30 is less than the width of the tube element 16 and less than the width of the annular support drum 12.

In the present embodiment, it is necessary for the tube 16 to withstand approximately up to 30% circumferential strain or elongation upon expansion. The majority of this strain is concentrated in the side walls 28 of the tube 16. Thus, it is desirable to provide flexibility in the side walls 28 to allow for 30% circumferential strain. Minimizing the bonding area of the surface 30 enables the side walls 28 to flex without interference. The annular raised surface portion 32 minimizes the area of bonding of the tube 16 to the support drum 12 to enable the tube 16 to be expanded without interfering with the movement of the side walls 28. This enables the lower wall portion 26 of the tube element 16 to uniformly expand in an inwardly radially direction away from the support drum 12. If tube element 16 were bonded to the support drum 12 substantially throughout the width of its annular peripheral surface 30, then the bonding of surface 30 to surface 14 would tend to interfere with the radial movement of the side walls 28 by making the surface 30 essentially rigid where it is bonded to the support drum 12. By minimizing the area of bonding of the annular surface 30 to the drum 12, freedom of movement of the side walls 28 is provided upon expansion and contraction of the tube element 16.

The lower wall portion 26 includes an annular peripheral surface 34 upon which an annular array of gripper means or gripper blocks 36 is disposed. The plurality of gripper blocks 36 are operable to engage with a portion of a tire 27, schematically illustrated in phantom lines in FIG. 2, which has been disposed centrally of the annular array of gripper blocks 36 upon expansion of the tube element 16. Upon expansion of the tube element 16, the lower wall portion 26 moves in a radially inwardly direction along with the gripper blocks 36 to decrease the diameter of the annular array of gripper blocks. As is illustrated in phantom lines in FIG. 2, when a tire portion is centrally disposed in the annular array of gripper blocks 36 and the tube 16 is expanded, the diameter of the annular array of gripper blocks will decrease to enable the gripper blocks 36 to firmly grip the tire portion disposed centrally thereof. This will enable the carrier apparatus 10 to grip the tire portion and effect movement thereof to a desired position. When the tube element 16 is contracted, the tire portion which is gripped thereby will be released due to an increase in the diameter of the annular array of gripper blocks 36. The gripper blocks 36 are preferably constructed of a low durometer rubber which is softer than the rubber from which the walls of the tube element 16 are constructed to enable the gripper blocks 36 to conform to a tire portion to be gripped thereby.

The gripper blocks 36 are bonded to or formed integrally with the annular peripheral surface 34 of the tube element 16. The adjacent gripper blocks 36 in the annular array of gripper blocks are separated by the rubber portions 38 which basically have a thickness equal to the thickness of the lower wall portion 34 of the tube element 16. The relatively thin portions 38 between the adjacent gripper blocks 36 allows movement of the wall portion 34 between adjacent gripper blocks 36 upon contraction and expansion of the tube element 16. This enables the annular array of gripper blocks 36 to maintain a substantially annular configuration upon expansion and contraction of the tube element 10 due to the resiliency of the portions 38 which connect the gripper blocks 36. Such a construction enables the gripper blocks 36 to move in a substantially radial direction upon expansion and contraction of the tube element 16 to thereby insure that all of the gripper blocks positively engage a portion of the tire which is desired to be gripped. If the portions 38 were not flexible, deformation of the annular array of gripper blocks 36 would occur which would prevent all of the gripper blocks 36 from uniformly engaging with the surface of a tire portion to be gripped.

The tube element 16 includes an annular inner tube 40 which is constructed of rubber and preferably neoprene. (In the present application the terms rubber and neoprene will be used interchangeably and it is Applicant's intention that both such terms denote rubber or a resilient, nonporous rubber-like substance or the equivalent.) Bonded to the inner tube 40 are four bias plys 42 (schematically illustrated) which add strength to the tube element 16 without unduly increasing its stiffness which would limit its expandability. A cover 44 which is in part (in the upper wall portion 24) bonded to the four biased plys is provided and is constructed of rubber and preferably neoprene. A pair of ply bands 46 is interposed between the cover 44 and the four biased plys 42 in the lower wall portion 26 of the tube element 16. The ply bands 46 may be bias ply bands or radial ply bands to add strength to the lower wall portion 26 but in the preferred embodiment are radial ply bands. The two radial ply bands 46 are coextensive with the lower wall portion 26 of the tube element 16. The two radial ply bands stiffen the lower wall portion 26 to prevent the tube 16 from collapsing upon contraction thereof. Moreover, the bands 46 add strength to the lower wall portion 26 to allow the gripper blocks 36 to be contracted upon contraction of the tube element 16 without the use of auxiliary springs.

It should be appreciated that the radial ply bands 46 do not extend around the total circumference of the tube 16 but rather are limited to the lower wall portion 26 adjacent the gripper blocks 36. This provides weaker side walls for large expansion to enable the tube to withstand a 30% circumferential strain upon gripping a portion of a tire. The radial ply bands 46 also provide a strong lower wall portion 26 which support the gripper blocks 36. It is important in the construction of the tube that the side walls 28 remain flexible to allow for uniform radial expansion and contraction of the gripper blocks 36 while the lower wall portion 26 has an increased strength to control the radial movement of the gripper blocks 36 while providing for retraction of the lower wall portion 26 and the gripper blocks 36 upon contraction of the tube element 16. If the radial ply bands were to extend totally around the circumference of the tube 16, the side walls would be made too stiff to allow a 30% circumferential strain which normally occurs on expansion of the tube element 16. Accordingly, the radial ply bands only extend in the lower wall portion 26 and a portion of the side walls 28.

In the preferred embodiment of the present invention the carrier apparatus 19 is utilized to transfer a tread and a radial tread ply band for a radial tire from a work station in which the band is constructed to a work station wherein the uncured tread is cured. In operation the carrier 10 is centered over a tread and a radial tread ply band when the tube element 10 is in its contracted condition. When the tread and radial tread ply band is centrally located in the annular array of gripper blocks 36, the tube element is pressurized and expanded to decrease the diameter of the array of gripper blocks 36 and enable the gripper blocks 36 to engage and grip the peripheral edge of the tread and radial tread ply band. The carrier is then moved to transfer the gripped tread and radial tread ply band to a predetermined location. When the tread and radial tread ply band is located in its predetermined position, the tube element 16 is contracted to increase the diameter of the array of gripper blocks 36 to thereby release the gripped tread and radial tread ply band. The present carrier apparatus could also be utilized for gripping and transporting other annular portions of a built tire between work stations.

From the foregoing, it should be apparent that a new and improved expandable carrier apparatus for transferring a tread and radial tread ply band from a building station to a further work station has been provided. The expandable carrier apparatus includes an annular support member having an annular inner peripheral surface and a fluid expandable annular tube element having an upper wall portion and a lower wall portion. The upper wall portion includes an annular peripheral surface bonded along a portion of the width thereof to the inner peripheral surface of the support member and the lower wall portion includes an annular outer peripheral surface having a plurality of gripper means supported thereupon and operable to engage and grip a radial tread ply band upon expansion of the tube element. The lower wall portion includes a plurality of radial ply bands disposed adjacent to the plurality of gripper blocks to increase the rigidity of the lower wall portion to provide for uniform radial movement of the lower wall portion and the gripper means upon expansion of tube element and to prevent collapse of the tube element upon contraction.

We claim:

1. An expandable carrier apparatus for transferring a tread and a radial tread ply band from a building station to a further work station comprising an annular support member having an annular inner peripheral surface, and a fluid expandable annular tube element having an upper wall portion and a lower wall portion, said lower wall portion being movable radially away from said upper wall portion upon expansion of said tube element and being movable radially toward said upper wall portion upon contraction of said tube element, said upper wall portion including an annular peripheral surface bonded along a portion of the width thereof to said annular inner peripheral surface of said support member, said lower wall portion including an annular outer peripheral surface, a plurality of gripper means supported in an annular array on said annular outer peripheral surface of said lower wall portion, said annular array of gripper means being operable to engage and grip a tread and a radial tread ply band disposed centrally of said annular array of gripper means upon expansion of said tube element, said tube element when expanded effecting a decrease in diameter of said annular array of gripper means and when contracted effecting an increase in the diameter of said annular array of gripper means to thereby effect the release of a gripped tread and radial tread ply band, a plurality of ply bands disposed only in said lower wall portion adajcent said plurality of gripper means to increase the rigidity of said lower wall portion to provide for uniform radial movement of said lower wall portion and said gripper means disposed thereon upon expansion of said tube element to effect gripping of a tread and a radial tread ply band thereby and to prevent collapse of said tube element upon contraction.

2. An expandable carrier apparatus as defined in claim 1 wherein said tube element further includes a plurality of bias plys extending through said upper and lower wall portions for adding strength to said wall portions of said tube element and said plurality of gripper means include a plurality of resilient gripper blocks disposed in an annular array on said annular outer peripheral surface of said lower wall portion, said plurality of gripper blocks being movable away from said annular support member upon expansion of said tube element to decrease the diameter of said annular array of gripper blocks to enable said gripper blocks to securely grip a tread and a radial tread ply band that has been centrally located inside said annular array of gripper blocks prior to expansion of said tube element.

3. An expandable carrier apparatus as defined in claim 2 wherein said tube element further includes a pair of side walls interposed between said upper and lower wall portions and wherein said annular peripheral surface of said upper wall portion includes an annular raised surface portion, said raised surface portion having a width which is less than the width of said annular support member and less than the width of said annular peripheral surface of said upper wall portion, said raised portion of said annular peripheral surface of said upper wall portion being bonded to said annular inner peripheral surface of said support member and wherein the area of bonding of said raised portion of said annular peripheral surface relative to the area of said annular peripheral surface of said upper wall portion is minimized to enable said tube element to uniformly expand without restricting the movement of said side walls.

4. An expandable carrier apparatus as defined in claim 3 wherein said plurality of gripper blocks are spaced apart, in said annular array on said annular outer peripheral surface of said lower wall portion, a sufficient distance to enable those portions of the lower wall portion of the tube element disposed between adjacent gripper blocks to expand and contract upon expansion and contraction of said tube element to provide for uniform expansion and contraction of said annular array of gripper blocks.

5. An expandable carrier apparatus as defined in claim 4 wherein said plurality of ply bands include first and second radial ply bands disposed only in said lower wall portion adjacent said plurality of gripper blocks to add rigidity and strength to said lower wall portion without interfering with the flexibility of said side walls to enable said lower wall portion to effectively support said gripper blocks and move said gripper blocks radially toward said upper wall portion without the use of auxiliary spring means upon contraction of said tube element.

6. An expandable carrier apparatus as defined in claim 5 wherein said upper and lower wall portions of said tube element further include a rubber base layer, and a rubber cover layer, said plurality of bias plys being interposed between said base layer and said cover layer, said radial ply bands being disposed between said bias plys and said cover layer in said lower wall portion and wherein said gripper blocks are formed from a lower durometer rubber than said rubber cover layer to enable said gripper blocks to conform to a tread and radial tread ply band gripped thereby.

7. An expandable carrier apparatus for transferring a portion of a built tire from a first work station to a second work station comprising an annular support member having an annular peripheral surface, and a fluid expandable annular tube element having an upper wall portion having an outer peripheral surface adapted to be bonded to said annular peripheral surface of said support structure and a lower wall portion cooperating with said upper wall portion to define an annular chamber for receiving fluid therein to effect expansion of said tube element, said lower wall portion being movable in a radially inwardly direction away from said upper wall portion upon expansion of said tube element and being movable in a radially outwardly direction towards said upper wall portion upon contraction of said tube element, said lower wall portion including an annular outer peripheral surface, a plurality of gripper means disposed in an annular array on said outer peripheral surface of said lower wall portion, said gripper means being operable to engage and grip a tire portion disposed in a position surrounded by said outer peripheral surface of said lower wall portion upon expansion of said tube element and being operable to ungrip the tire portion upon contraction of said tube element, said lower wall portion including a plurality of ply bands disposed adjacent said outer peripheral surface thereof to increase the rigidity of said outer peripheral surface of said lower wall portion to enable said gripper means to release a tire portion gripped thereby upon contraction of said tube element.

8. An expandable carrier apparatus for transferring a portion of a built tire from a first work station to a second work station as defined in claim 7 further including a plurality of bias plys extending through said upper and lower wall portions for adding strength to said wall portions of said tube element and said plurality of gripper means include a plurality of resilient gripper blocks disposed in an annular array on said annular outer peripheral surface of said lower wall portion, said plurality of gripper blocks being movable away from said annular support member upon expansion of said tube element to decrease the diameter of said annular array of gripper blocks to enable said gripper blocks to securely grip a portion of a built tire that has been centrally located inside said annular array of gripper blocks prior to expansion of said tube element.

9. An expandable carrier apparatus for transferring a portion of a built tire from a first work station to a second work station as defined in claim 8 further including a pair of side walls interposed between said upper and lower wall portions and wherein said annular peripheral surface of said upper wall portion includes an annular raised surface portion, said raised surface portion having a width which is less than the width of said annular support member and less than the width of said annular peripheral surface of said upper wall portion, said raised portion of said annular peripheral surface of said upper wall portion being bonded to said annular inner peripheral surface of said support member and wherein the area of bonding of said raised portion of said annular peripheral surface relative to the area of said annular peripheral surface of said upper wall portion is minimized to enable said tube element to uniformly expand without restricting the movement of said side walls.

10. An expandable carrier apparatus for transferring a portion of a built tire from a first work station to a second work station as defined in claim 8 wherein said plurality of gripper blocks are spaced apart, in said annular array on said annular outer peripheral surface of said lower wall portion, a sufficient distance to enable those portions of the lower wall portion of the tube element disposed between adjacent gripper blocks to expand and contract upon expansion and contraction of said tube element to provide for uniform expansion and contraction of said annular array of gripper blocks.

11. An expandable carrier apparatus for transferring a portion of a built tire from a first work station to a second work station as defined in claim 8 wherein said plurality of ply bands include first and second radial ply bands disposed only in said lower wall portion adjacent said plurality of gripper blocks to add rigidity and strength to said lower wall portion to enable said lower wall portion to effectively support said gripper blocks without interfering with the flexibility of said side walls and move said gripper blocks radially toward said upper wall portion without the use of auxiliary spring means upon contraction of said tube element.

12. An expandable carrier apparatus for transferring a portion of a built tire from a first work station to a second work station as defined in claim 11 wherein said upper and lower wall portions of said tube element further include a rubber base layer and a rubber cover layer, said plurality of bias plys being interposed between said base layer and said cover layer, said radial ply bands being disposed between said bias plys and said cover layer in said lower wall portion.

13. An expandable carrier apparatus for transferring a portion of a built tire from a first work station to a second work station comprising an annular support member having an annular peripheral surface, and a fluid expandable annular tube element having a first wall portion having an outer peripheral surface adapted to be secured to said annular peripheral surface of said support structure and a second wall portion disposed diametrically opposite from said first wall portion and cooperating with said first wall portion to define an annular chamber for receiving fluid therein to effect expansion of said tube element, said second wall portion being movable in a radial direction away from said first wall portion upon expansion of said tube element and being movable in a radial direction toward said first wall portion upon contractions of said tube element, said second wall portion including an annular outer peripheral surface, a plurality of gripper means disposed in an annular array on said outer peripheral surface of said second wall portion, said gripper means being operable to engage and grip a tire portion disposed in a position surrounded by said outer peripheral surface of said second wall portion upon expansion of said tube element and being operable to ungrip the tire portion upon contraction of said tube element.

14. An expandable carrier apparatus for transferring a portion of built tire from a first work station to a second work station as defined in claim 13 wherein said plurality of gripper means includes a plurality of resilient gripper blocks disposed in an annular array on said annular outer peripheral surface of said second wall portion, said plurality of gripper blocks being movable away from said annular support member upon expansion of said tube element to decrease the diameter of said annular array of gripper blocks to enable said gripper blocks to securely grip a portion of a built tire that has been centrally located inside said annular array of gripper blocks prior to expansion of said tube element.

15. An expandable carrier apparatus for transferring a portion of a built tire from a first work station to a second work station as defined in claim 14 wherein said plurality of gripper blocks are spaced apart, in said annular array on said annular outer peripheral surface of said lower wall portion, a sufficient distance to enable those portions of the lower wall portion of the tube element disposed between adjacent gripper blocks to expand and contract upon expansion and contraction of said tube element to provide for uniform expansion and contraction of said annular array of gripper blocks.

* * * * *